United States Patent [19]
Anderson

[11] Patent Number: 5,412,907
[45] Date of Patent: May 9, 1995

[54] DEEP, FREE-STANDING, CONVERTIBLY SUBDIVIDED, PLANT CONTAINER ASSEMBLY

[76] Inventor: George C. Anderson, 2425 SE. Moores St., Portland, Oreg. 97222

[21] Appl. No.: 308,693

[22] Filed: Sep. 19, 1994

[51] Int. Cl.⁶ .............................................. A01G 9/02
[52] U.S. Cl. ................................................ 47/85; 47/73
[58] Field of Search ............... 47/85, 73 R; 220/552, 220/533, 528, 529

[56] References Cited

U.S. PATENT DOCUMENTS

| | | |
|---|---|---|
| 879,769 | 2/1908 | Hight . |
| 1,912,505 | 6/1933 | Weston ................... 220/552 |
| 3,689,051 | 9/1972 | Miller ...................... 220/552 |
| 3,858,746 | 1/1975 | Hirota ......................... 47/85 |
| 3,920,144 | 11/1975 | Callen ......................... 47/85 |
| 4,065,877 | 1/1978 | Kelley . |
| 4,453,344 | 6/1984 | Van Wingerden . |
| 4,499,997 | 2/1985 | Swingley, Jr. ............ 220/552 |
| 4,595,246 | 6/1986 | Bross ........................ 220/552 |
| 4,777,764 | 10/1988 | Wingerden . |

FOREIGN PATENT DOCUMENTS

| | | | |
|---|---|---|---|
| 2373947 | 8/1978 | France ........................... 47/85 |
| 1952 | of 1912 | United Kingdom ............ 47/85 |
| 2219481 | 12/1989 | United Kingdom . |

Primary Examiner—Ramon S. Britts
Assistant Examiner—Joanne C. Downs
Attorney, Agent, or Firm—Eugene D. Farley

[57] ABSTRACT

A deep, free-standing, convertibly subdivided plant container adapted particularly for use in growing deep rooted plants. The container comprises an outer case having a floor comprising a plurality of bands arranged in a selected pattern as required to form ventilating openings. An inner, removable divider comprises a plurality of telescoping, interfitting plates having a cross sectional pattern predetermined to position the plates in bearing engagement with the bands when the divider is inserted in the case. Means also are present for manipulating the divider and for stabilizing it against displacement during use.

11 Claims, 2 Drawing Sheets

DEEP, FREE-STANDING, CONVERTIBLY SUBDIVIDED, PLANT CONTAINER ASSEMBLY

BACKGROUND OF THE INVENTION

This invention relates to container assemblies of the class employed by nurserymen for growing plants.

Although a variety of plant container assemblies are available in the marketplace, need exists for such an assembly which is adaptable particularly for growing deep-rooted plants such as oak trees and apple trees.

Further need exists for such an assembly which, though deep, is free standing and readily convertible from a form in which it is employed to grow but a single plant, to one in which it is adapted to grow a plurality of plants, each in an individual compartment.

Need also exists for a compartmentized container which, although easily convertible from single to compartmentized form, nevertheless is stable in use in both modes.

It is the general purpose of the present invention to provide such a container assembly.

GENERAL STATEMENT OF THE INVENTION

In its broad aspect, the present invention comprises a deep, free-standing, convertibly subdivided plant container in which a divider component is removably positioned in an outer case. The outer case has side walls and a floor comprising a plurality of bands arranged in a selected pattern predetermined to define a plurality of ventilating floor openings.

The divider comprises a plurality of interfitting, telescoping partition plates having a cross sectional pattern predetermined to position the plates in bearing engagement with the bands when the divider is inserted in the case.

The plates are slotted for mutual interfitting engagement. They are provided with means for facilitating their use, i.e. with guide means for facilitating their interengagement; with stabilizing means for stabilizing the assembly in its compartmented use embodiment; and with tab means for facilitating insertion of the divider into the case and for removing it therefrom.

Accordingly the container is suitable for use either per se or in an assembled condition in which the divider compartmentizes an outer case to provide a tall, free standing assembly suitable for use in growing deep-rooted plants.

THE DRAWINGS

DETAILED DESCRIPTION OF A SPECIFIC EMBODIMENT OF THE INVENTION

Figure 1:
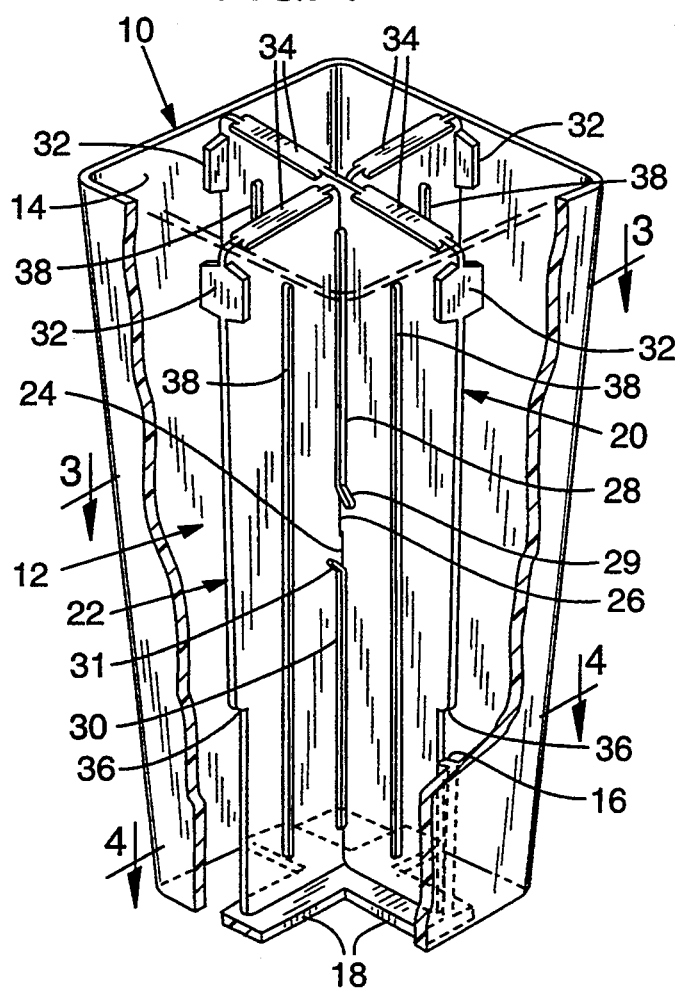
FIG. 1 is a top perspective view of the plant container assembly of my invention.
Figure 2:
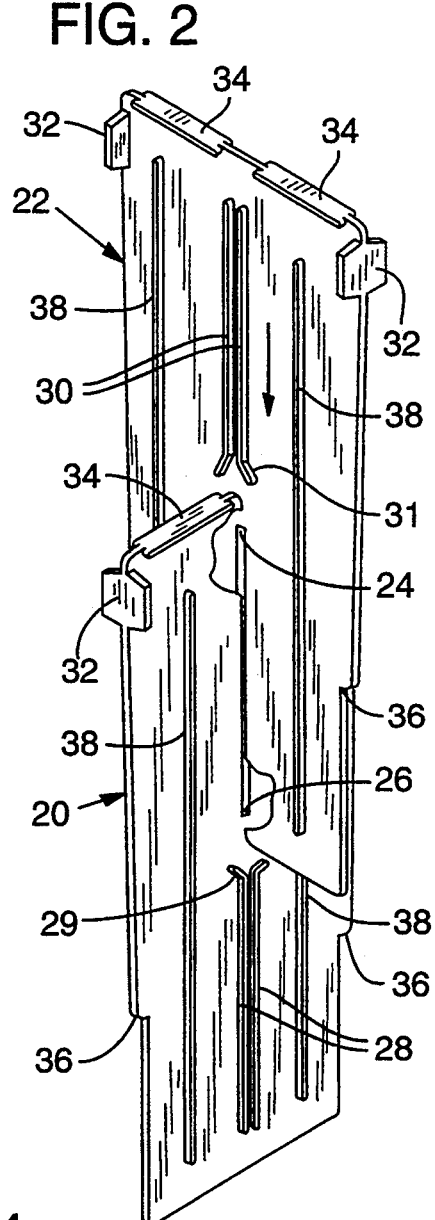
FIG. 2 is a detailed view of the divider component of the container assembly, with the parts separated to show the manner of assembly.

As shown particularly in FIG. 1, the plant container assembly of my invention comprises broadly a case component indicated generally at 10 and a divider component indicated generally at 12.

Figure 4:
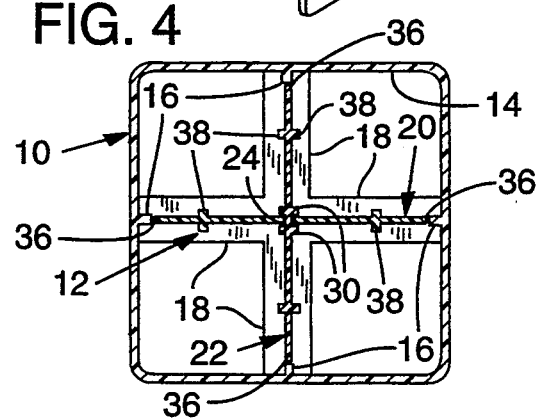
FIG. 4 is a sectional view taken along line 4—4 of FIG. 1.
Figure 5:
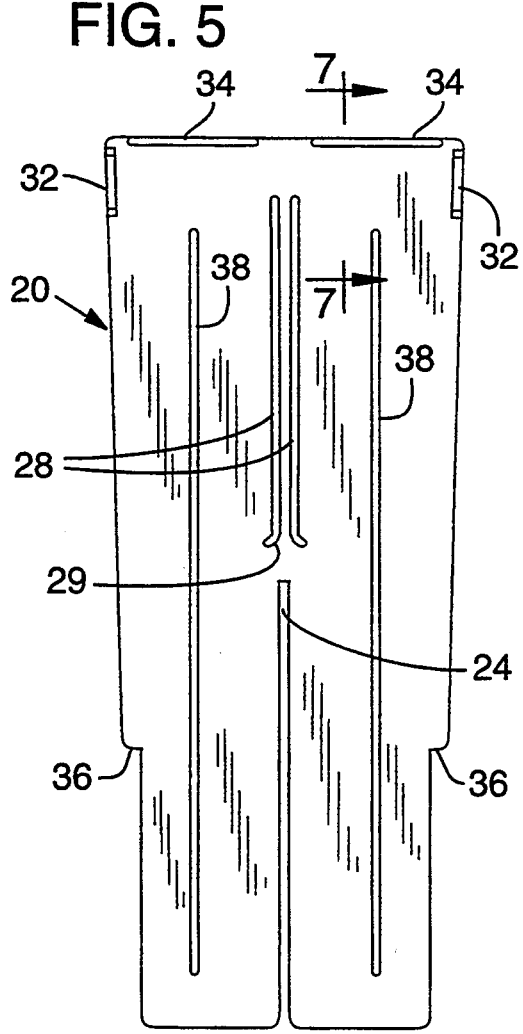
FIG. 5 is a detailed view in elevation of one of the constituent plates which make up the divider component of the container assembly.
Figure 6:
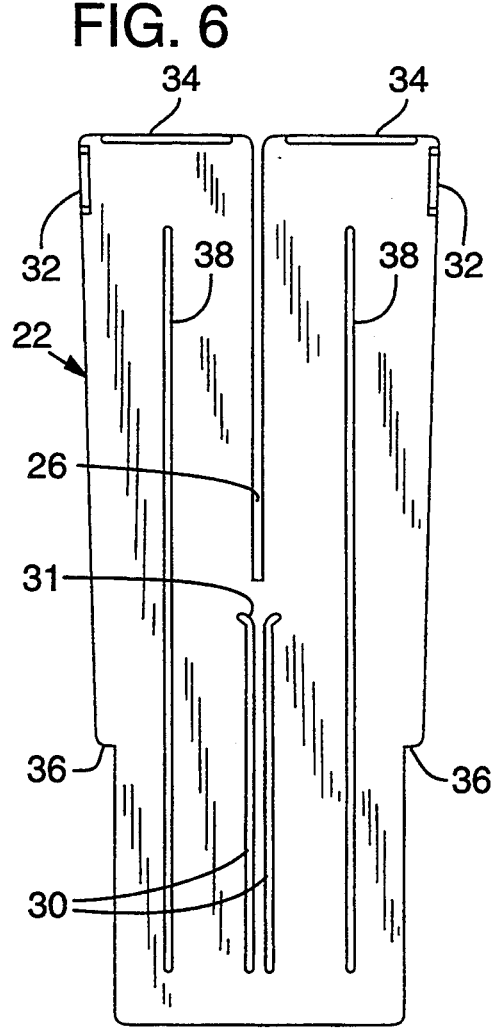
FIG. 6 is a detailed view in elevation of a companion plate of the divider component.
Figure 7:
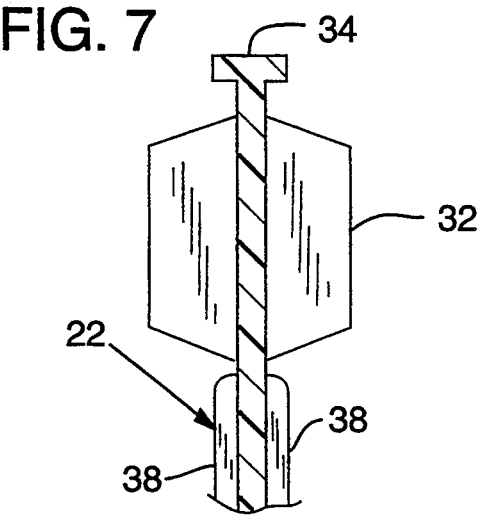
FIG. 7 is a fragmentary sectional view taken along line 7—7 of FIG. 5.

Case 10 may be formed from a single unitary piece of molded plastic. It comprises tapered side walls 14 having on their lower interior surfaces longitudinal ribs 16, FIG. 4. The latter serve the function of directing root growth.

The bottom or floor of case 10 comprises a plurality of bands 18. These are arranged in a selected pattern predetermined to define in the floor a plurality of ventilating openings. The openings preferably are of substantial size to permit the circulation of warm air through the growing medium during the nursery episode.

The top of case 10 is open.

Divider component 12 comprises a pair of flat plates 20, 22. These are substantially similar, being mirror images of each other.

In the illustrated form of the invention the case is rectangular in cross section and there are two plates 20, 22 forming in the assembled mode a total of four growing cells or compartments. It will be understood, however, that in practice there may be an arrangement such that a multiplicity of cells results.

Plates 20, 22 have a cross sectional pattern predetermined to position them in bearing engagement with floor bands 18 when the divider is inserted into the case. The arrangement is such that the bands provide a sufficient floor to retain growing medium in the cells, while still permitting a major circulation of air.

Each of plates 20, 22 has a slot extending from a margin to its center in order to permit the mutual interfitting telescopic arrangement of the plates in an assembled criss-cross arrangement. Thus plate 20 has extending upwardly from its lower margin a slot 24. Plate 22 has a similar slot 26 extending downwardly from its upper margin.

Tongue and groove guide means are provided for facilitating the above procedure. Accordingly, plate 20 is provided longitudinally centrally with a guide groove 28. This has a flared entrance segment or mouth 29.

Similarly, plate 22 is equipped at its opposite end with a guide groove 30 having a flared inner end 31.

Figure 3:
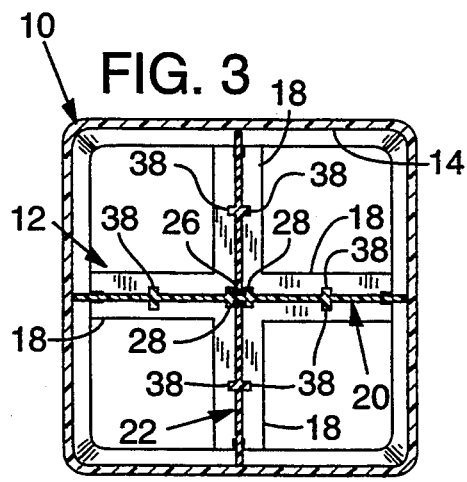
FIG. 3 is a sectional view taken along line 3—3 of FIG. 1.

The tongue component of the tongue and groove guide is provided by the margin of each plate which enters the associated groove, as shown in FIG. 3.

The remaining elements of plates 20, 22 are identical, one to the other.

Stabilizing means are present for stabilizing the plates in their assembled position of FIG. 1. As illustrated particularly in that figure, a bearing pad 32 is mounted on each of the upper outer edges of each plate. This pad is positioned and dimensioned to bear against the interior face of the case side wall 14 when the divider is inserted in the case. In company with other stabilizing pads 32, it prevents collapse of the divider when the case is being processed, as by filling it with dirt.

Means also are present to assist in placing the divider in the case and removing it therefrom.

Such means comprise the finger tabs 34 present on the top of each divider plate segment.

Still further, the lower margins of the divider plates are cut away to provide recesses 36. In the assembled condition of the container, these recesses align with case ribs 16. Together with the adjacent divider plates, they form a continuous barrier against roots growing from one compartment to the other.

Longitudinal ribs 38 located centrally of plates 20, 22 assist in directing root growth.

There thus is provided a deep, free-standing plant container assembly which is readily convertible from a unitary condition in which it will grow but a single plant to a compartmented condition in which it will grow a plurality of plants, each in an individual cell.

It is to be understood that the form of my invention herein shown and described is to be taken as a preferred example of the same and that various changes in the shape, size and arrangement of parts may be resorted to without departing from the spirit of my invention or the scope of the subjoined claims.

I claim:

1. A deep, free-standing, convertibly sub-divided, plant container assembly comprising:
   a) an outer case having side walls and a floor comprising a plurality of bands arranged in a selected pattern predetermined to define in the floor a plurality of ventilating openings, and
   b) an inner, removable divider comprising a plurality of telescoping, interfitting partition plates having a cross sectional pattern predetermined to position the plates in bearing engagement with the bands when the divider is inserted in the case.

2. The plant container assembly of claim 1 wherein the partition plates comprise plates slotted for mutual interfitting interengagement.

3. The plant container assembly of claim 2 including guide means for guiding the plates into mutual interfitting interengagement.

4. The plant container assembly of claim 3 wherein the guide means comprises tongue and groove guide means.

5. The plant container assembly of claim 4 wherein the tongue and groove guide means comprise tongue portions of the partition plates and cooperating slots on adjacent surfaces of a companion partition plate.

6. The plant container assembly of claim 1 including root growth control interior ribs extending longitudinally of the case.

7. The plant container assembly of claim 6 wherein the ribs are located opposite the divider and including recesses in the divider dimensioned for reception of the ribs.

8. The plant container assembly of claim 1 including a plurality of spaced ribs extending longitudinally of the partition plates for root growth control when the partition plates are inserted in the case.

9. The plant container assembly of claim 1 including partition stabilizing means interengaging the divider and the case for locating and stabilizing the divider in its working position.

10. The plant container assembly of claim 9 wherein the stabilizing means comprises a plurality of bearing pads mounted one on each partition plate and positioned for bearing engagement with the case.

11. The plant container assembly of claim 1 wherein the partition plates have upper margins and including a plurality of finger tabs mounted on the said margins for assisting in inserting the divider into the case and removing it therefrom.

* * * * *